UNITED STATES PATENT OFFICE.

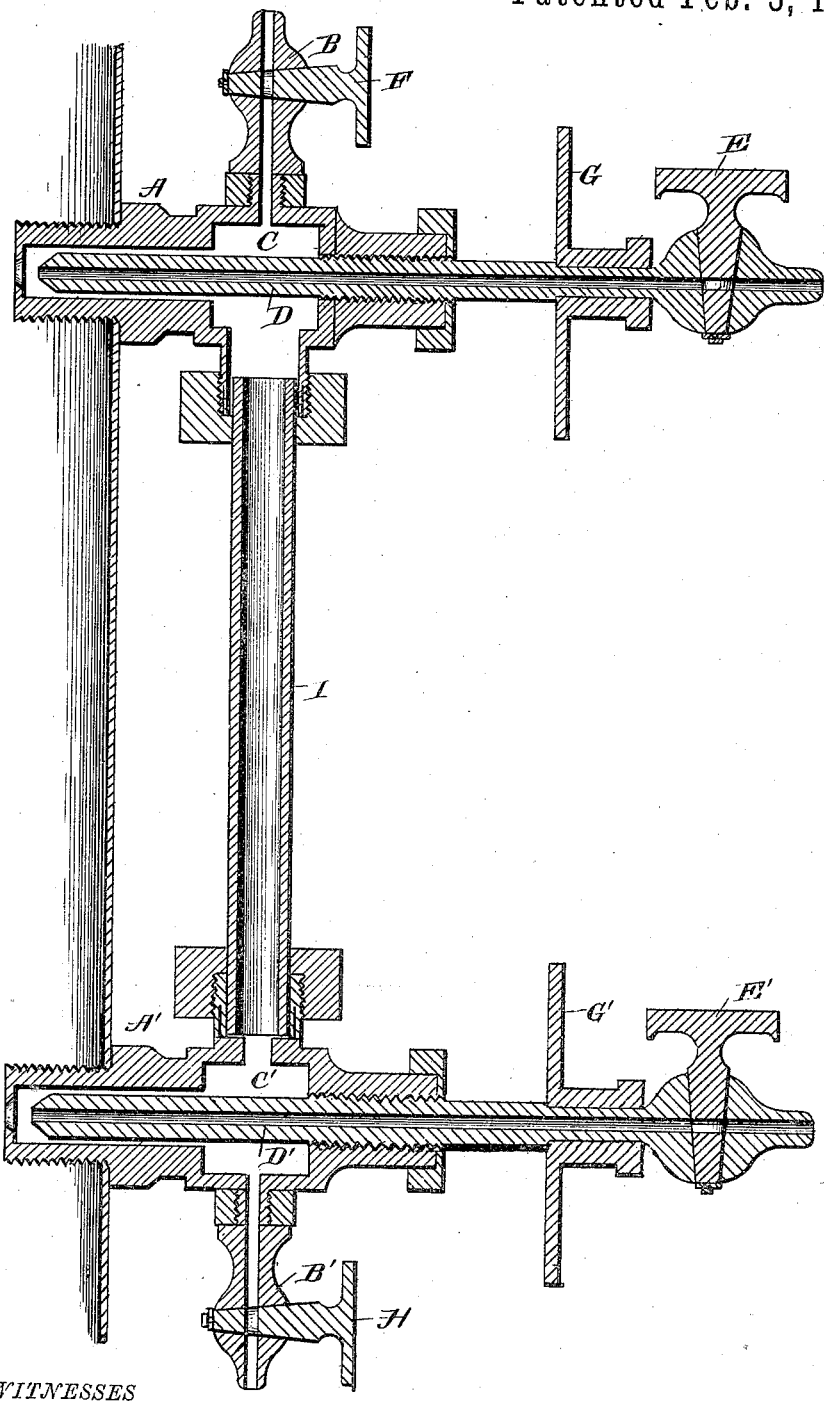

GEORGE SIDLEY CHASE, OF BELLEFONTE, PENNSYLVANIA.

WATER-GAGE.

SPECIFICATION forming part of Letters Patent No. 311,471, dated February 3, 1885.

Application filed August 9, 1884. (No model.)

*To all whom it may concern:*

Be it known that I, GEORGE SIDLEY CHASE, a citizen of the United States, residing at Bellefonte, in the county of Centre and State of Pennsylvania, have invented a new and useful Improvement in Water-Gages, of which the following is a specification, reference being had to the accompanying drawing.

My invention has relation to water-gages or water-glass gages for steam-boilers; and it has for its object to provide a device of the class referred to that shall possess superior advantages in point of simplicity and general efficiency; and the invention consists in the construction and novel arrangement of parts, as will be hereinafter fully described, and particularly pointed out in the claim.

In the drawing, the figure is a vertical sectional view of a water-gage embodying my improvements.

Referring by letter to the accompanying drawing, A A' designate the water-cock and steam-cock of the indicator, which are connected by the water-glass I in the usual manner. B B' are the valve-seats for the cocks A A'. C and C' are steam and water chambers in the cocks A and A'. These steam and water chambers are connected by the vertical glass tube I, and the valve-stems D and D' pass horizontally through said chambers. E E' are the cocks or valves on the ends of the hollow valve-stems D D'. A wire can be introduced through the hollow valve-stems D D' directly into the boiler to clear out any obstruction that may be in the valve-stems or valve-seats.

F designates the cock or valve on the top of the water-gage which permits the cleaning of the water-glass without removing the glass from its place, which is accomplished by closing the steam-valve of the gage in the ordinary manner, and allowing the water to blow through the water-glass from the water-valve or lower valve, thereby cleansing the water-glass or tube.

G G designate handles or wheels, which, however, are not essential, and may be dispensed with.

H designates a try-cock at the lower end of the water-gage.

Having thus fully described my invention, what I claim as new, and desire to secure by Letters Patent of the United States, is—

The combination, with the bodies of the steam-cock and water-cock connected by the water-glass, of the hollow valve-stems provided with valves or cocks near their outer ends, as set forth.

In testimony that I claim the foregoing as my own I have hereto affixed my signature in presence of two witnesses.

GEORGE SIDLEY CHASE.

Witnesses:
 FRANK B. STOVER,
 JOHN N. LANE.